Patented Mar. 10, 1942

2,276,250

UNITED STATES PATENT OFFICE 2,276,250

ALKYLATION OF HYDROCARBONS

Jacque C. Morrell, Chicago, Ill., assignor to Universal Oil Products Company, Chicago, Ill., a corporation of Delaware No Drawing. Application February 29, 1940, Serial No. 321,404

8 Claims. (Cl. 196—10)

This invention relates to the treatment of isoparaffinic hydrocarbons, both gaseous and liquid. In a more specific sense the invention is concerncerned with a novel process for alkylating isoparaffinic hydrocarbons, comprising isobutane and relatively low boiling normally liquid isoparaffins, to produce saturated hydrocarbons of higher molecular weight which may be utilized as components of motor fuel for automobile and airplane engines.

The utilization of these isoparaffinic and olefinic hydrocarbons in alkylation reactions has been carried out in the presence of sulfuric acid alone or diluted by relatively small quantities of water. The present type of catalyst is a marked improvement over the previous types in that the activity of the catalytic material may be controlled more accurately by proper dilution with relatively inert substances. Also addition of the preferred diluents or spacing agents lowers the freezing point of sulfuric acid of 100% concentration so that this material may be used more conveniently as an alkylating catalyst at temperatures below its normal freezing point which is approximately 10° C.

In one specific embodiment the present invention comprises the alkylation of isoparaffinic hydrocarbons by olefinic hydrocarbons in the presence of a catalyst consisting of a major proportion of sulfuric acid and a relatively minor proportion of an inorganic compound soluble therein.

A feature of the present invention is the dilution of sulfuric acid of approximately 100% concentration by a non-aqueous diluent so that the ordinarily vigorous reaction of sulfuric acid on catalytic condensation reactions among hydrocarbons is moderated to the extent that reactions of alkylation occur in preference to other less desirable reactions such as, for example, ester formation and polymerization. Also in order to obtain good results it is important to use the proper combination of temperature, time of contact, amount of acid catalyst, and alkylating activity of said acid catalyst in order to avoid side reactions such as oxidation, polymerization, sulfonation, and the like. Inasmuch as considerable heat is evolved during alkylation in the presence of a sulfuric acid-containing catalyst, it may be desirable to cool the isoparaffin hydrocarbons, for example, the isobutane, undergoing alkylation by olefins so that the heat evolved during the reaction will not cause the temperature of the mixture to rise above the desired reaction temperature.

The amount of sulfuric-acid containing catalyst employed is preferably in the approximate range of 20–100 volumes of acid per 100 volumes of hydrocarbons undergoing treatment at any one time, although in some operations, smaller volume ratios of acid to hydrocarbons present in the reaction mixture may be used when employing longer times of contact.

The concentrations of sulfuric acid in the composite catalysts which have been found desirable in the preferred temperature range, for example, from approximately −10° to about 30° C. are generally in excess of 90%. For example, good results may be obtained in the alkylation of normally gaseous paraffin hydrocarbons with normally gaseous olefins in the presence of catalyst composites consisting of approximately 95–90% by weight of sulfuric acid and about 5–10% by weight of a spacing agent selected from a group which will be described in later paragraphs of this specification. Depending upon the reactivity of the hydrocarbon components in a given alkylation reaction, sulfuric acid of different concentrations and different proportions of sulfuric acid and diluents may be employed. These spacing agents may be employed also with sulfuric acid containing an excess of sulfur trioxide and commonly classed as fuming sulfuric acid or sulfuric acid of a concentration in the approximate range of 100–105%. As additional means of regulation of the upper limits of temperature, the concentrations of acid, and the proportions of acid and diluent shown here may be varied to produce good results, providing they are co-ordinated properly. For instance, the reaction of isobutane with propene may require more severe conditions such as somewhat higher temperature or higher acid concentration than the reaction of isobutane with the more reactive isobutene. Pressures may be employed to assist the reaction and to prevent undue loss of the material by vaporization and, when desirable, to maintain the hydrocarbons undergoing reaction substantially in liquid phase or to effect liquefaction of a portion of the reacting hydrocarbons.

As spacing agents or diluents for sulfuric acid to produce alkylation catalysts suitable for use in alkylation of isoparaffins by olefins, the present invention contemplates the use of a number of inorganic compounds which are soluble to a substantial extent in sulfuric acid. Suitable inorganic spacing agents include such compounds as boric oxide, meta-boric and ortho-boric acids, and certain metal sulfates. A number of metal sulfates which are sufficiently soluble in sulfuric acid to permit their alternative use in the present invention, although not on an equivalent basis, are listed in the following table together with the solubility at 25° C. in sulfuric acid of 100% concentration:

| Metal sulfate | Mole percent solubility |
|---|---|
| Lithium | 14.28 |
| Potassium | 9.24 |
| Barium | 8.85 |
| Sodium | 5.23 |
| Calcium | 5.16 |
| Mercurous | 0.78 |
| Silver | 9.11 |

Some of the above indicated inorganic materials may also be used in sulfuric acid solutions of lower and higher concentrations. For example, approximately 2 parts by weight of calcium sulfate dissolves in 100 parts by weight of sulfuric acid of 90% concentration at approximately 25° C.; while in fuming sulfuric acid at the same temperature approximately 10 parts by weight of the salt dissolves per 100 parts by weight of acid. Solutions prepared by dissolving calcium sulfate in concentrated sulfuric acid at 100° C. are known to yield calcium acid sulfate on cooling.

From the statements hereinabove set forth concerning the types of compounds which may be employed as diluting or spacing materials for sulfuric acid alkylation catalysts, it will be evident that a large number of catalyst composites of varying composition may be made to suit the needs of different alkylation reactions.

While in most cases the utility of the alkylating composite employed is due principally to the sulfuric acid, it is recognized that the inorganic compounds used as spacing agents may at times exert a definite chemical influence upon the reactions other than merely moderating the effect of the sulfuric acid. It will also be evident that the selection of any particular compound or mixture of compounds for use with sulfuric acid will be determined by solubility relations, the ease of alkylating the paraffinic hydrocarbons involved, the general operating conditions, and the matter of economy in the cost of the reagents. In general, such problems will be solved by those familiar with the art without great difficulty.

The process of the invention is applicable to the alkylation of butanes by their olefinic counter-parts as the butenes, propene, and, higher olefins. Isobutane can be alkylated much more readily than normal butane by normally gaseous olefins. Apparently normal butane must undergo some isomerization prior to alkylation.

Alkylation of isoparaffinic hydrocarbons by olefins is of particular importance to the oil industry in connection with the cracking process, the fixed gases from which ordinarily contain large quantities of 3- and 4-carbon atom hydrocarbons both olefinic and paraffinic. Processes are in commercial operation which catalytically polymerize the 3- and 4-carbon atom olefins to form liquid products suitable as hydrocarbon motor fuel but the paraffinic hydrocarbons in these gases are substantially unaffected by these processes. While the production of high octane number motor fuel from gaseous olefins commonly utilizes only the olefins and requires two steps of treatment, namely, polymerization followed by hydrogenation; the present process forms isooctanes and other isoparaffins of motor fuel boiling range by direct alkylation, for example, of isobutane by either normal butenes or isobutene.

The actual operation of the process admits of some modification, depending upon the normal phase of the reacting constituents and whether batch or continuous operation is employed.

In a simple type of batch process, a paraffin to be alkylated such as isobutane is brought to a temperature within the approximate range specified in the presence of the necessary amounts of a catalyst comprising sulfuric acid and a spacing agent, and alkylation is effected by the gradual introduction of an olefin or preferably an olefin-isoparaffin mixture under the surface of the liquid which may be stirred mechanically to effect intimate contact between catalyst and the reacting hydrocarbons and to prevent settling of the acid catalyst or acid sludge which is heavier than the liquid menstruum. Alkylation may be allowed to progress to different stages of reaction. In the case of the alkylation of isobutane by propene or butenes, the best products from the standpoint of motor fuel are produced usually by the condensation of equimolecular quantities. It is preferable to maintain an excess of isoparaffin at all times in the reaction zone as in the method of operation hereinabove described. The presence of such an excess of isoparaffin tends to minimize undesirable polymerization reactions.

As illustrative of the type of results normally obtainable by the use of the present process, the following specific examples may be given:

*Example I*

A pressure autoclave equipped with a mechanical stirrer was charged with 190 parts by weight of sulfuric acid of 100% concentration, 10 parts by weight of boric oxide, and 232 parts by weight of a butane mixture containing 81% isobutane and 19% n-butane. While this mixture was stirred at 10° C. under a pressure of 80 pounds per square inch, 42 parts by weight of propene was introduced during 120 minutes and the resultant mixture was stirred for 240 minutes more. After this treatment, 62 parts by weight of hydrocarbon layer was separated from the catalyst layer as a substantially saturated product containing 94% of gasoline.

*Example II*

189 parts by weight of the catalyst layer after use in Example I was mixed with 232 parts by weight of butane (81% iso- and 19% n-butane) in a stirring autoclave at 10° C. under a pressure of 80 pounds per square inch while 42 parts by weight of propene was introduced during 310 minutes. After the resulting mixture was stirred for 50 minutes more, 68.5 parts by weight of a substantially saturated hydrocarbon layer was separated from the catalyst.

The broad scope of the present invention is evident from the preceding specification and from the examples given, although neither section is intended to be unduly limiting.

I claim as my invention:

1. A process for producing gasoline boiling range hydrocarbons from isoparaffin and olefin hydrocarbons which comprises simultaneously contacting an isoparaffin and an olefin at an alkylating temperature with sulfuric acid to which has been added an inorganic oxygen-containing boron compound in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

2. A process for producing gasoline boiling range hydrocarbons from isoparaffin and olefin hydrocarbons which comprises simultaneously contacting an isoparaffin and an olefin at an alkylating temperature with sulfuric acid to which has been added a boric acid in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

3. A process for producing gasoline boiling range hydrocarbons from isoparaffin and olefin hydrocarbons which comprises simultaneously contacting an isoparaffin and an olefin at an alkylating temperature with sulfuric acid to which has been added boric oxide in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

4. A process for producing gasoline boiling range hydrocarbons from isoparaffin and olefin hydrocarbons which comprises simultaneously contacting an isoparaffin and an olefin at an alkylating temperature with sulfuric acid of a concentration in the approximate range of 90–105% to which has been added an inorganic oxygen-containing boron compound in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

5. A process for producing gasoline boiling range hydrocarbons from isoparaffin and olefin hydrocarbons which comprises simultaneously contacting an isoparaffin and an olefin at a temperature in the approximate range of —10 to +30° C. with sulfuric acid of a concentration in the approximate range of 90–105% to which has been added an inorganic oxygen-containing boron compound in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

6. A process for producing gasoline boiling range hydrocarbons from isoparaffin and olefin hydrocarbons which comprises simultaneously contacting an isoparaffin and an olefin at an alkylating temperature under a liquefying pressure with sulfuric acid of a concentration in the approximate range of 90–105% to which has been added an inorganic oxygen-containing boron compound in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

7. A process for producing gasoline boiling range hydrocarbons from isoparaffin and olefin hydrocarbons which comprises simultaneously contacting an isoparaffin and an olefin at an alkylating temperature of the order of —10 to +30° C. under a liquefying pressure with sulfuric acid of a concentration in the approximate range of 90–105% to which has been added a boric acid in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

8. A process for producing gasoline boiling range hydrocarbons from isoparaffin and olefin hydrocarbons which comprises simultaneously contacting an isoparaffin and an olefin at an alkylating temperature of the order of —10 to +30° C. under a liquefying pressure with sulfuric acid of a concentration in the approximate range of 90–105% to which has been added boric oxide in an amount sufficient to substantially dilute the sulfuric acid and correlating the amount and concentration of the acid, the reaction temperature, and the proportion of olefin to isoparaffin to effect alkylation of said isoparaffin by said olefin as the principal reaction in the process with minimum olefin polymerization, thereby chemically combining said isoparaffin and olefin hydrocarbons to form a heavier hydrocarbon boiling in the gasoline range.

JACQUE C. MORRELL.